July 1, 1952           E. W. FAHEY           2,601,922
DEVICE FOR SEPARATING CARTONS OF EGGS
Filed Aug. 20, 1945           2 SHEETS—SHEET 1
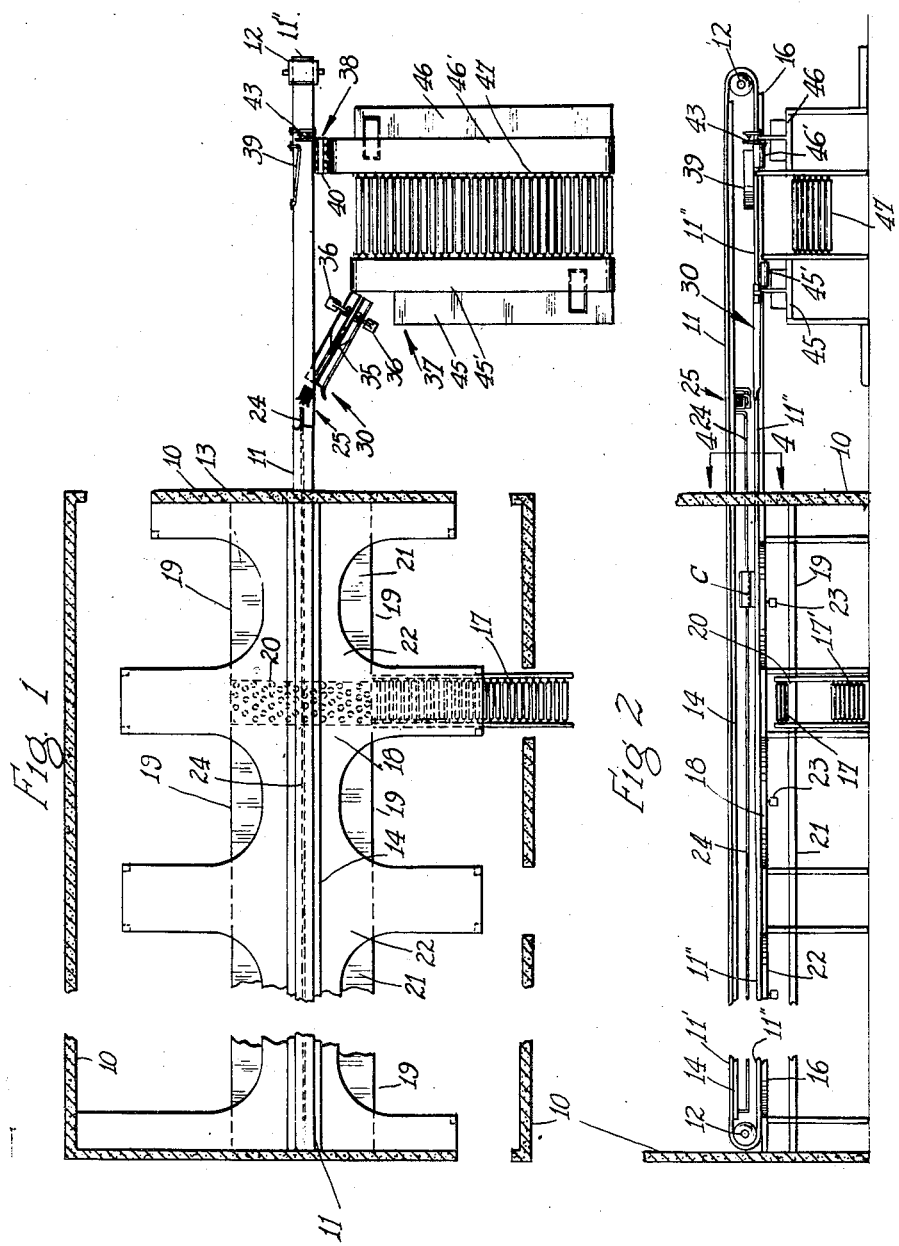
INVENTOR.
Edward W. Fahey
BY
Cromwell, Greist & Warden
Att'ys.

July 1, 1952 E. W. FAHEY 2,601,922
DEVICE FOR SEPARATING CARTONS OF EGGS
Filed Aug. 20, 1945 2 SHEETS—SHEET 2
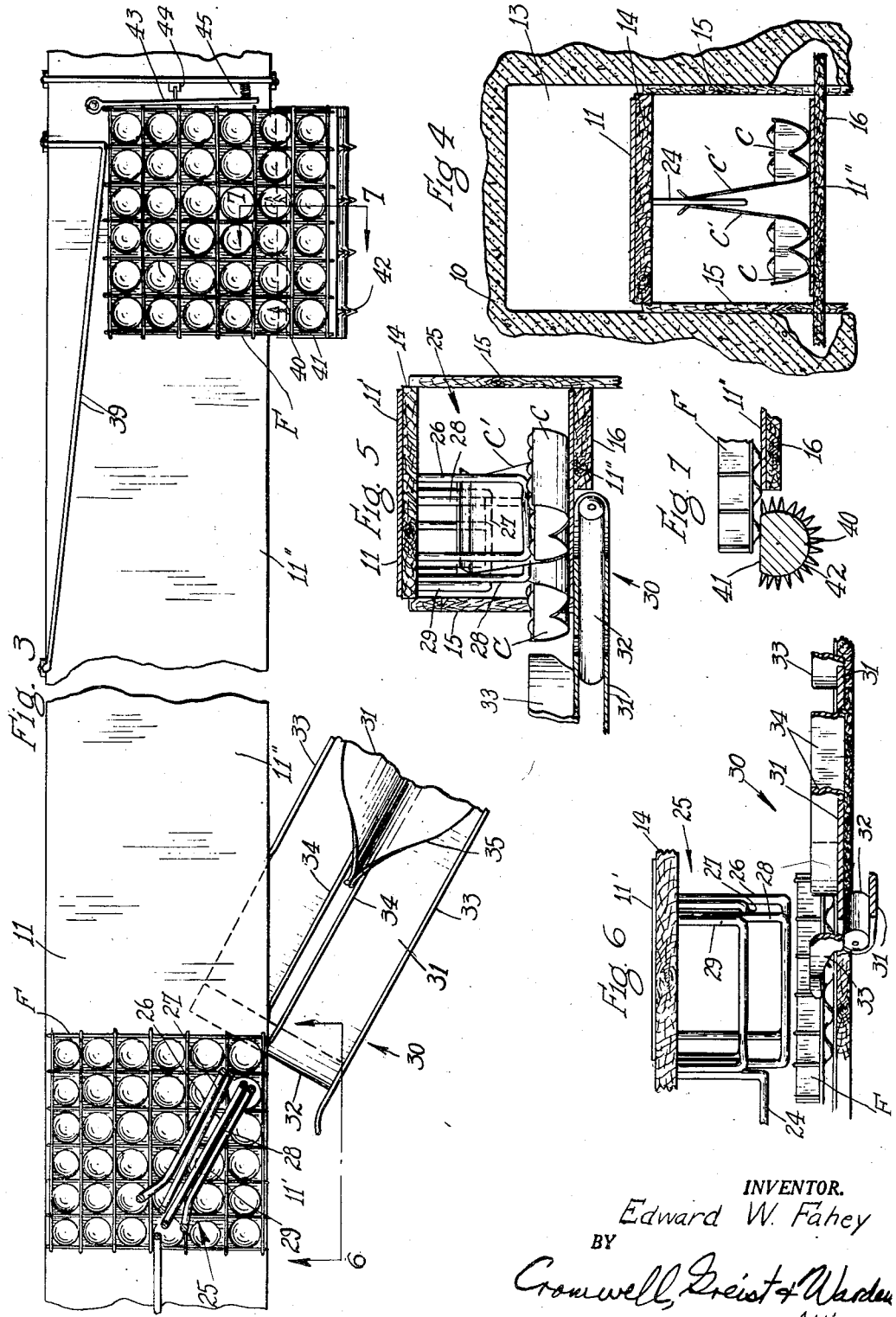
INVENTOR.
Edward W. Fahey
BY
Cromwell, Greist & Warden
Att'ys.

Patented July 1, 1952

2,601,922

UNITED STATES PATENT OFFICE 2,601,922

DEVICE FOR SEPARATING CARTONS OF EGGS

Edward W. Fahey, Chicago, Ill., assignor, by mesne assignments, to Shellmar Products Corporation, Chicago, Ill., a corporation of Delaware Application August 20, 1945, Serial No. 611,589

6 Claims. (Cl. 209—90)

This invention relates to packaging apparatus, in particular of the type employed in the handling, inspection and cartoning of eggs.

It is an object of the invention to provide packaging apparatus or machinery of the type described suitable for installation in an egg inspecting, grading, cartoning and forwarding plant of large capacity which will permit these operations to be performed efficiently and expeditiously with a relatively small personnel.

More specifically it is an object to provide apparatus for the handling and disposal of eggs in a so-called "egg room," including provisions for receiving the eggs in conventional 15 or 30 dozen size cases, packed in said cases in conventional filler and flat assemblies; for candling the eggs, including their separation into edible and inedible classifications, and the further classification of the edible eggs into a variety of grades based on color, weight, condition of shell and condition of contents; for the packaging of such graded eggs in conventional egg cartons; and for the disposal in conventional filler and flat assemblies of some of the (usually inedible) eggs.

Additionally, it is an object of this invention to provide such apparatus, utilizing conveyor means so constructed and arranged as to coincidentally function as a means of transporting both eggs which have been classified and cartoned and other eggs not in cartons, but reposing in conventional 6 x 6 filler and flat assemblies; said conveyor means having associated therewith automatically operable means for angularly diverting egg cartons relative to the conveyor at a predetermined point for passage through carton closing means or other instrumentality, while the filler and flat assemblies are permitted to remain on the conveyor for further travel in the direction thereof, plus means for ultimately automatically diverting said filler and flat assemblies from the main conveyor.

A still further object of the invention is the provision of a simple diverter means, operable only upon egg cartons, which functions on cartons fed by the conveyor in more than one path of travel to divert the same angularly relative to the direction of the main conveyor means, yet which never diverts filler and flat assemblies transported thereunder and which prevents egg cartons from becoming overturned during said diversion.

A still further object is the provision of a single unit for this purpose and which holds oppositely positioned cartons in adjacent, back-to-back relationship during diversion, and means for separating the cartons when the diversion operation has been substantially accomplished, for further treatment or handling.

Yet a further object of the invention is the provision of conveyor means of the above type having a common discharge station for several classes or grades of eggs.

The foregoing statements are indicative in a general way of the nature of the invention, but other and more specific objects will be apparent to those skilled in the art upon a full understanding of the construction and operation of the device.

One embodiment of the invention is presented herein for the purpose of exemplification, but it will be appreciated that the invention is susceptible of incorporation in other modified forms coming equally within the scope of the appended claims.

In the drawings,

Fig. 1 is a diagrammatic plan view of an egg room in which the unit of my invention is employed;

Fig. 2 is a diagrammatic side view of the apparatus shown in Fig. 1;

Fig. 3 is a fragmentary plan view of a portion of the apparatus shown in Fig. 1, on a larger scale for clarity of illustration;

Fig. 4 is a cross-sectional view on enlarged scale of the carton diverting device of the apparatus, being taken on a line corresponding to line 4—4 of Fig. 2;

Fig. 5 is a cross-sectional view generally similar to Fig. 4, but taken at a different point to illustrate the carton diverting device of the apparatus;

Fig. 6 is a view in section, generally on line 6—6 of Fig. 3; and

Fig. 7 is a detail in section generally on line 7—7 of Fig. 3.

Of recent years the handling, inspection, classification and packaging of eggs in a centralized unit wherein those operations are all performed has gained progressively increasing popularity, but many problems have been presented in attaining acceptably efficient operation of such egg rooms. Notable among these are the large amount of manual labor involved, the multiplicity of operations such as the make-up of cartons, supply of uncandled eggs, candling of the many grades and then proper separation after candling into cartons, the closing, sealing and dating of the cartons, and the disposal of empty egg cases. Performance of these operations has involved use of a multiplicity of belts, conveyors, transporting devices, etc., all resulting in increased monetary outlay and by no means resulting in a fully satisfactory system.

It is the purpose of the instant invention to provide conveyor means which greatly simplifies the large scale handling and packaging of eggs in overcoming the disadvantages set forth immediately above.

Referring to Figs. 1 and 2 wherein there is shown a diagrammatic illustration of a typical egg room 10 embodying the apparatus of my invention, the reference numeral 11 indicates a main conveyor, preferably of the endless belt type, carried by pulleys 12, said belt extending longitudinally through the darkened egg room 10 and outwardly of one of the walls thereof, through an aperture 13 in the wall. Conveyor belt 11 is arranged so that the upper flight thereof, indicated at 11', may carry set-up egg cartons from a carton set-up station at the right to the candlers in room 10. Said upper flight is sustained by an upper supporting surface 14 carried by uprights 15 (see Figs. 4 and 5) which may be provided internally and externally of the candling room for this purpose. These or similar uprights, along with the walls of the room, sustain various other instrumentalities to be described. The belt pulleys 12 are driven by any appropriate means (not shown) and the diameter of the pulleys is such that a considerable space is provided between the upper and lower flights of the belt 11, the numeral 11'' indicating the lower flight. Said lower flight is sustained vertically on a table 16 carried by the uprights. Appropriate guide rails (not shown) are preferably provided at either side of and parallel to upper and lower belt flights 11' and 11'', respectively, to effectively guide articles transported on either flight.

The reference numeral 17 designates one of a plurality of lateral, roller type conveyors upon which filled egg cases may be placed for easy gravity transfer to a central storing station 18 between two pairs of opposed stations 19. Four egg candlers, facing the conveyor 11 in stations 19, may be serviced by said conveyors 17. Beyond the end of conveyors 17 a plurality of friction reducing ball races 20 are mounted on the upper surface of the candling bench or table 21, which support the cases while their contents are extracted by the candlers at stations 19. Positioned below in the same vertical plane as conveyor 17 another similar conveyor 17' provides a means of disposal for empty egg cases. Appropriate shelving 22 placed parallel to and above table 21 provides space for storage of empty, and partially filled egg cartons, as well as conventional filler and flat combinations. In that space between table 21 and shelving 22 conventional egg candling lights 23 may be placed, one such light for each candler.

Referring now to Figs. 3 to 7 inclusive; wherein certain of the devices embodied in the apparatus are shown on larger scale than in Figs. 1 and 2, the width of the endless belt 11 is approximately the same as the length of a standard egg carton C, and the length of a standard egg carton is approximately the same as the length of a side of a square 6 x 6 egg case flat and filler assembly F, both of which are transported on the lower flight 11'' of the belt 11 in the manner more fully hereinafter set forth.

As particularly shown in Figs. 2, 3 and 4, a divider member 24 depending from the support 14 to a predetermined point above lower belt flight 11'' extends medially and longitudinally of the conveyor belt for a considerable portion of the length thereof. Divider member 24 is spaced sufficiently above lower belt flight 11'' to permit passage thereunder of squared 6 x 6 flat and filler assemblies F and, as further shown in Fig. 4, said divider also serves to guide filled egg cartons C having the covers C' thereof upraised in a double path of travel, and, preferably, in back-to-back relation.

As shown, divider member 24 terminates intermediate the ends of the main conveyor 11 and adjacent this terminus a diverter means, generally indicated 25, is provided, comprising in this instance four depending guide elements 26, 27, 28 and 29, extending at an acute angle to the path of travel of the lower belt flight 11''. These elements, and also the divider member 24, may be formed of bent rod stock secured like the member 24 to the support 14 in depending relation thereto. However, it is apparent that they might also be in the form of plates or the like suitably supported in vertically spaced relation above the lower belt flight. The elements 26 and 28 depend an identical distance from their support to a point only sufficiently above flight 11'' to permit passage of the bodies of cartons C and the filler and flat assemblies F therebeneath. These elements engage the carton covers C' immediately adjacent the folding hinge thereof in the manner shown in Fig. 5; while the alternate elements 27, 29 depend a shorter distance and engage the covers C' at a more elevated point on the side thereof opposite elements 26, 28 respectively. At their ends adjacent guide 24 the outer elements 26, 29 are flared outwardly so as to insure reception of carton covers C' between the respective pairs of diverter elements 26, 27 and 28, 29. Hence, said covers and cartons are positively diverted from the direction of travel of conveyor 11 onto a secondary conveyor 30 positioned with its upper reach just below and at an acute angle to conveyor belt flight 11''.

Secondary conveyor 30 is illustratively shown as comprising endless belts 31 borne by pulley 32. Guides 33 provide lateral guidance for the cartons positioned thereon and center guide rails 34 medially divide the conveyor 30 into two paths, in traveling which the carton covers C' are closed and latched by entirely conventional means 35. This closer per se constitutes no part of the invention. Hence, it has been illustrated only fragmentarily. It is contemplated that a closing apparatus of the general type illustrated and decribed in the patent to Burger No. 1,994,241, of March 12, 1935, be employed. A suitable mechanism may be provided adjacent conveyor 30 to seal the closed cartons passing therealong and a conventional rotary printer 36 completes the cartoning by impressing a date and/or other indicia on the carton.

The completed cartons are discharged by secondary conveyor 30 to a discharge station located adjacent the right-hand end of conveyor 11 and generally indicated by numeral 37.

As had been previously pointed out, diverter means 25 operates only on egg cartons and only upon the upraised covers of such cartons. Filler and flat assemblies carrying eggs which are of a grade not desired to put into egg cartons may therefore be put on lower flight 11'' of conveyor 11 and freely pass beneath and beyond diverter 25, arriving in due course adjacent the discharge station 37.

My invention contemplates mechanism, shown diagrammatically on the drawings and generally indicated 38, adjacent the terminus of conveyor 11 to transfer filler and flat assemblies F from lower conveyor flight 11'' to egg discharge station 37. Such mechanism is illustrated conventionally in Figs. 3 and 7, comprising a fixed cam 39 extending over lower belt flight 11'' at an angle thereto, along which the assemblies F slide and are shifted laterally of said belt in so sliding. A transfer roller 40 is journaled along side of belt 11 with its axis parallel to the belt, said roller having a flat 41 thereon in the plane of the lower belt flight 11'' (see Fig. 7). On the remainder of its periphery roller 40 carries pins 42 or other friction means engageable with the filler and flat assembly F to shift the same laterally off belt 11 when the roller is rotated. As appears in Figs. 3 and 7, cam 39 positions the assembly with a substantial overhang relative to the roller flat 41 and against a pivoted switch arm 43 extending across belt flight 11''. This arm controls a switch 44 being urged to break the switch contact by a spring 45. Switch 44 controls the rotation of roller 40 through suitable conventional wiring, motor and controls, so that when closed by abutment of assembly F thereagainst the roller is caused to rotate and transfer the assembly to the discharge station 37. Preferably an arrangement is made whereby the roller will always come to rest with flat 41 uppermost. Since these electrically actuated instrumentalities constitute, in their details, no part of the present invention, they are not more fully illustrated.

At discharge station 37 the closed cartons C are received on a sorting bench 45 while the assemblies F are received at a sorting station or bench 46. A disposal conveyor 47 is located between benches 45, 46 to service the same.

From the foregoing description it is apparent that practically 100% of the eggs handled by each candler will be transported on the conveyor 11, all those eggs in cartons being carried in two connected but angularly divergent paths and those eggs in filler and flats being carried in only a single straight line path. Egg cartons will often be in back-to-back relation as shown in Figs. 4 and 5 and often a single egg carton in one path of travel may be followed by a flat and filler assembly, or possibly a plurality of the same. In other words, the sequence and position of individual egg cartons and individual fillers and flats on the conveyor may be quite indiscriminately mixed. The cartons C and assemblies F are nevertheless properly disposed of in a uniform and expeditious manner.

As egg cartons pass beyond the terminus of divider means 24, intermediate of the length of conveyor 11, the upraised covers are guidingly supported and turned angularly into the space between diverter elements 26, 27 on the one hand, or elements 28, 29 on the other. It has been found that by supporting the egg carton cases along their inner sides at a lower level than the support given them along their outer sides, i. e., adjacent the cover fold line, a relationship particularly shown in Fig. 4, the cartons are effectively held upright during diversion. Once the end of an egg carton has passed beyond the edge of the main conveyor, it begins to be guided along its lower edges by guides 33 of secondary conveyor 30, the endless belt means 31 of which carries the cartons free from conveyor 11 and thence passes such cartons through the conventional carton closer 35 and printer 36. From here the carton discharges on sorting table or bench 45 at egg discharge station 37. Said table may be provided with any desired carton conveyor or supporting means designated 45'.

As particularly shown in Fig. 3, filled filler and flat assemblies F, being of less height than the lowermost portions of diverter 25, are not diverted at this point from their normal single path of travel, hence they continue beyond this point on lower flight 11'' to a point adjacent the end of conveyor 11 where is located a filler and flat diverting means 38. Upon receipt of a filler and flat assembly said means is activated, transferring such filler and flat assemblies to a sorting table 46, also at egg discharge or disposal station 37. Like bench 45, table 46 may be supplied with desired supporting or conveying means 46 for the assemblies F.

Egg cartons received at table 45 and filler and flat assemblies received at table 46 are then packed into appropriate cases, one grade, class or type of egg to each case, and the filled cases are pushed onto centrally positioned disposal conveyor 47 for conveyance to any desired place.

Various modifications in the above apparatus will suggest themselves. Thus either or both of the conveyors 11, 31 may be one-piece conveyors or split into individual belts servicing separate carton paths. Further means may be provided to insure uniform transportation of cartons C with their covers upright, for unfailing introduction into the diverter 25, thence onto the secondary conveyor, which is essential in the operation of the apparatus. Likewise, the cartons need not be fed in back-to-back relation; the opposite relationship or a relationship in which each cover is separated from the other by one carton body, are both suitable for the operation of a slightly modified embodiment. Moreover, travel of the cartons, once they have entered the closing device, need not necessarily be parallel; and any number of different operations may be performed thereon while so traveling, following diversion to the secondary conveyor 30.

All such obvious modifications are regarded as within the scope of the invention as defined by the appended claims. Fundamentally, the apparatus is characterized by flexibility or versatility in the indiscriminate handling of cartons and flat and filler assemblies, whereby absolutely no handling or supervision need be exercised in the proper disposition of these different objects from the time they are disposed on conveyor 11 until after they are discharged at different respective points at the discharge station 37.

I claim:

1. Apparatus of the type described, comprising a longitudinally extending main carton conveyor of sufficient width to receive egg case flat and filler assemblies, divider means extending along said conveyor for a substantial portion of the length thereof and positioned thereabove sufficiently to allow passage therebelow of said egg case flat and filler assemblies, said divider means providing two elongated egg carton receiving and conveying lanes along said conveyor, a secondary conveyor positioned adjacent said main conveyor at an angle thereto, and means operative upon egg cartons passing along said main conveyor for diverting the same therefrom to said secondary conveyor, but ineffective to divert said assemblies from the main conveyor, said last named means comprising a pair of generally parallel elements disposed adjacent said secondary conveyor and engageable with opposite sides of the covers of cartons traversing each of said respective lanes.

2. Apparatus of the type described, comprising a main conveyor of sufficient width to receive 6 x 6 flat and filler assemblies, divider means extending along and above said main conveyor a sufficient distance to permit passage thereunder of said flat and filler assemblies and sufficiently depending to guide egg cartons having upraised covers in two channels, a secondary conveyor positioned angularly relative to said main conveyor intermediate its length, a diverter means, operable only upon egg cartons, adapted to divert said egg cartons to said secondary conveyor while permitting flat and filler assemblies to remain on said main conveyor, said diverter means including means engageable with opposite sides of the covers of the egg cartons to hold the same upright during diversion.

3. A conveyor system for eggs indiscriminately packed in egg cartons and in flat and filler assemblies, comprising a main conveyor of sufficient width to receive and transport filled 6 x 6 egg case flat and filler assemblies, divider means extending along and above said conveyor for a substantial portion of the length thereof to define two elongated conveying lanes for egg cartons having upraised covers and a single elongated conveying lane for flat and filler assemblies, a secondary conveyor positioned adjacent said main conveyor at an acute angle thereto, diverter means operable on the upraised covers of egg cartons to divert them out of the path of travel of the main conveyor to the secondary conveyor, said last named means comprising a pair of generally parallel elements disposed adjacent said secondary conveyor and engageable with the covers of cartons traversing each of said respective lanes, said covers passing between said elements, and guide means operable below the carton covers for directing said egg cartons along said secondary conveyor.

4. A conveyor system for eggs indiscriminately handled in egg cartons and in flat and filler assemblies, comprising a conveyor for 6 x 6 egg case flat and filler assemblies, divider means extending along and above said main conveyor and defining two conveying lanes for egg cartons having upraised covers and placed on said conveyor with their upraised covers adjacent the divider and also affording a single conveying lane for flat and filler assemblies, diverter means spaced from the ends of the conveyor for diverting egg cartons from the latter, said last named means comprising means operative on opposite sides of the covers of the egg cartons irrespective of the lane in which they are conveyed and permitting flat and filler assemblies to remain on the conveyor after egg cartons are diverted therefrom.

5. Apparatus for handling cartons of the type characterized by an upstanding cover, as well as units of substantially less height than said cartons and their covers, comprising a longitudinal conveyor having a medial divider engageable with cartons traversing laterally spaced paths on said conveyor to guide and laterally separate the cartons, and a diverter disposed in angular relation to divert the cartons from the plane of travel thereof, comprising laterally spaced, generally parallel elements engageable with opposite sides of the upstanding carton covers to positively guide the same for angular travel relative to the conveyor, said elements being located sufficiently above the conveyor to enable passage of said units therebeneath.

6. Apparatus for handling cartons of the type characterized by an upstanding cover, as well as units of substantially less height than said cartons and their covers, comprising a longitudinal conveyor having a medial divider spaced thereabove under which said units travel on the conveyor, said divider being engageable with the covers of cartons traversing laterally spaced paths on said conveyor to guide and laterally separate the cartons, and a diverter disposed in angular relation to divert the cartons from the plane of travel thereof, comprising laterally spaced, generally parallel elements engageable with opposite sides of the upstanding carton covers to positively guide the same for angular travel relative to the conveyor, said elements being located sufficiently above the conveyor to enable passage of said units therebeneath.

EDWARD W. FAHEY.

REFERENCES CITED

The following references are of record in the file of this patent:

UNITED STATES PATENTS

| Number | Name | Date |
| --- | --- | --- |
| 1,030,479 | Ofstad | June 25, 1912 |
| 1,083,397 | Gilbert | Jan. 6, 1914 |
| 1,538,079 | Albertoli | May 19, 1925 |
| 1,617,505 | Smith | Feb. 15, 1927 |
| 1,693,014 | Anderson | Nov. 27, 1928 |
| 1,783,700 | Byington | Dec. 2, 1930 |
| 1,875,811 | Hilgers | Sept. 6, 1932 |
| 1,898,818 | Eggleston | Feb. 21, 1933 |
| 1,906,363 | Browning | May 2, 1933 |
| 1,930,318 | Mojonnier | Oct. 10, 1933 |
| 2,136,897 | Thayer | Nov. 15, 1938 |
| 2,261,767 | Johnson | Nov. 4, 1941 |
| 2,344,930 | Ferguson | Mar. 21, 1944 |